A. S. LEVAKE.
CAR-WHEEL.
No. 180,247. Patented July 25, 1876.
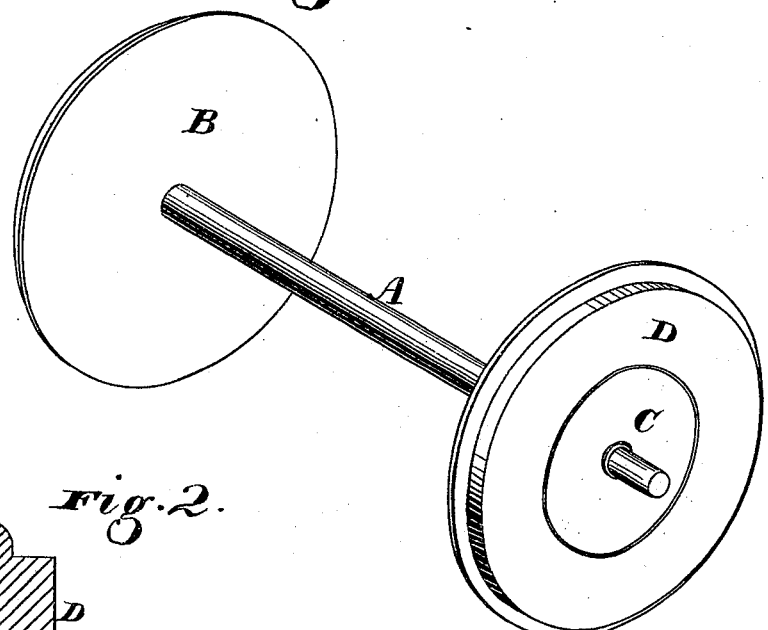
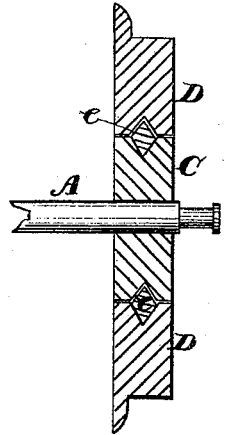
Witnesses: Geo. H. Strong, Jno. L. Bond.
Inventor: Anson S. Levake
by Dewey & Co.
his Attorneys.

UNITED STATES PATENT OFFICE.

ANSON SCOTT LEVAKE, OF SAN FRANCISCO, CALIFORNIA.

IMPROVEMENT IN CAR-WHEELS.

Specification forming part of Letters Patent No. 180,247, dated July 25, 1876; application filed May 5, 1876.

*To all whom it may concern:*

Be it known that I, ANSON SCOTT LEVAKE, of San Francisco city and county, State of California, have invented a Car-Wheel; and I do hereby declare the following description and accompanying drawings are sufficient to enable any person skilled in the art or science to which it most nearly appertains to make and use my said invention without further invention or experiment.

My invention relates to certain improvements in that class of car-wheels in which it is designed to allow one wheel to turn independently of the other upon curves in the road, while both wheels turn as one with the axle upon straight portions of the road.

My invention consists in a novel method of uniting the two parts of a divided car-wheel, so that the inner and outer parts shall be firmly held together, while a sufficient motion is allowed between them to allow them to accommodate themselves to curves.

Referring to the accompanying drawings for a more complete explanation of my invention, Figure 1 is a view showing a pair of wheels and axle having my improvement. Fig. 2 is a vertical section of a wheel.

A is the axle of a pair of wheels, having the wheel B put on tight at one end, and the inner portion C of the other wheel also made tight at the opposite end. The outside or rim D of this wheel fits closely to the part C, but sufficiently easy to allow it to move upon the inner part when the strain of turning a curve is brought upon it. A groove or notch is made in the meeting faces of the outer and inner parts of the wheel, and this groove is filled with Babbitt or any suitable metal, *e*, which will at the same time allow the parts to move upon each other, but will prevent them from being separated. This groove, it will be manifest, can be made of any convenient or suitable shape, and the metal with which it is filled will contract so as to form a solid piece with the inner part of the wheel over which the outer part moves.

I form two grooves, as before described, one in each part, and then fill it with some metal which can be cast in through an opening from the outside, and will contract upon the inner part of the wheel, leaving the outer part to move upon it.

Having thus described my invention, what I claim, and desire to secure by Letters Patent, is—

A wheel composed of an inner and outer part, C and D, having grooves made in their meeting-faces, which are filled with suitable metal, so as to form a flange, *e*, about which the rim can move, but which will prevent the parts from separating, substantially as herein described.

ANSON SCOTT LEVAKE.

Witnesses:
   GEO. H. STRONG,
   JNO. L. BOONE.